United States Patent Office 3,073,826
Patented Jan. 15, 1963

3,073,826
3-PYRROLIDYLMETHYL-4-QUINAZOLONES
Homer C. Scarborough, Evansville, Ind., assignor to Mead Johnson & Company, Evansville, Ind., a corporation of Indiana
No Drawing. Filed Oct. 20, 1960, Ser. No. 63,734
11 Claims. (Cl. 260—256.4)

This invention relates to new compositions of matter and, more particularly, to 3-pyrrolidylmethyl-4-quinazolones, the acid addition salts thereof, and processes for preparing the same.

The compounds of this invention have the following structural formula:

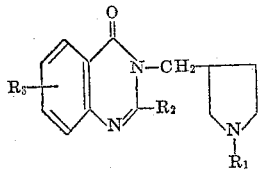

wherein $R_1$ is a lower alkyl, preferably containing up to about 6 carbon atoms; $R_2$ is selected from the group consisting of hydrogen and lower alkyl, such as methyl, ethyl and propyl; and $R_3$ is selected from the group consisting of hydrogen and halogen, wherein the halogen is preferably selected from the group consisting of chlorine and bromine. The nontoxic, pharmacologically acceptable, therapeutically active acid addition salts of these compounds are also contemplated as part of this invention.

The compounds of the present invention have valuable therapeutic and pharmacological properties and are particularly useful as anti-inflammatory agents. They may be administered orally in the form of tablets, capsules, or in a suitable liquid vehicle, such a syrup or an elixir, and the preferred dosage for mammals is about 1 to about 3 milligrams per kilogram of body weight per day.

The compounds of this invention may be prepared by the reaction of a 1-lower alkyl-3-pyrrolidylmethylamine with a compound selected from the group consisting of anthranils, halogenated anthranils or isotoic anhydrides. Hydrocarbon solvents, such as toluene, xylene and the like, are useful reaction media. In one embodiment of this invention, 2-lower alkyl-3-(1-lower alkyl-3-pyrrolidylmethyl)-4-quinazolone may be prepared by heating a mixture of equimolar amounts of 1-lower alkyl-3-pyrrolidylmethylamine with an anthranil in a solvent, such as toluene. To prepare the corresponding halogenated quinazolone of this embodiment, a halogenated anthranil, such as, for example, chloroacetanthranil, is substituted in the process as a starting material in lieu of acetanthranil. The following equation illustrates the above described reaction:

EQUATION I

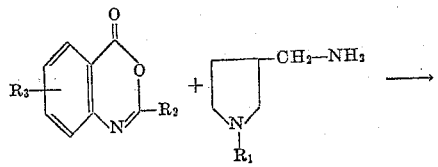

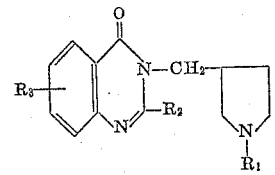

The above equation shows the reaction of acetanthranil with 1-lower alkyl-3-pyrrolidylmethylamine to form 2-substituted-3-(1-lower alkyl-3-pyrrolidylmethyl)-4-quinazolone, wherein $R_1$, $R_2$ and $R_3$ are as previously defined. Alkyl groups defined by $R_2$ preferably contain up to 3 carbon atoms.

In another embodiment of this invention 3-(1-lower alkyl-3-pyrrolidylmethyl)-4-quinazolone may be prepared by reacting substantially equimolar amounts of isotoic anhydride and 1-lower alkyl-3-pyrrolidylmethylamine. The initial step of the reaction may be carried out by heating the reactants, isotoic anhydride and pyrrolidylmethylamine, in a solvent under substantially anhydrous conditions to form a pyrrolidylmethylanthranilamide as an intermediate. The completion of the formation of the intermediate is determined by the cessation of gas (carbon dioxide) evolution. One preferred solvent for this step is an alcohol, such as ethanol. The intermediate product is then reacted with an organic acid, such as formic acid, preferably with heating, to produce the desired product. In lieu of formic acid, organic acids of the formula $R_2$-COOH may be used, wherein $R_2$ is as previously defined. Refluxing is a convenient mode of carrying out this step of the process.

Halogenated isotoic anhydrides used as starting materials in lieu of isotoic anhydride per se may be prepared by well known methods using halogenated anthanilic acid as a starting material.

The acid addition salts of the compounds of this invention may be prepared by conventional procedures. Exemplary of some useful nontoxic, pharmacologically acceptable salts are the hydrochlorides, hydrobromides, acetates, mucates, tartrates, sulfates and the like.

The following examples will illustrate the preparation of the compounds of this invention.

The starting materials, acetanthranil and haloacetanthranil, used in the synthesis of certain of the compounds of this invention, were prepared as follows:

A. *Acetanthranil*

One hundred three grams (0.75 mole) of anthranilic acid were added portionwise over a period of 15 minutes to 213 milliliters (2.25 mole) of acetic anhydride maintained at 120–130° C. in a 500 milliliter three-necked flask equipped with magnetic stirrer, thermometer and Claissen head attached to a condenser. The addition was slightly exothermic. The flask was then heated until 160 milliliters of distillate (boiling point 116–124° C.) were collected. The residue was filtered hot and diluted with 500 milliliters of isopropyl ether. Cooling gave a buff colored solid which was dried in vacuo over phosphorus pentoxide. The solid was suspended in 600 milliliters of hot isopropyl ether and an insoluble sludge removed by filtration. The liquor was treated with Nuchar activated charcoal, and cooled to furnish 90 grams, or an 80% yield of acetanthranil having a melting point of 78–81° C.

B. 6-Chloroacetanthranil

The reaction of 17.2 grams (0.1 mole) of 2-amino-5-chlorobenzoic acid and 30 milliliters of acetic anhydride gave, after recrystallizations from benzene-isopropyl ether, 17.5 grams of 6-chloroacetanthranil, having a melting point of 118–124° C.

EXAMPLE I

2-Methyl-3-(1-Ethyl-3-Pyrrolidylmethyl)-4-Quinazolone Dihydrochloride

A solution of 8.1 grams (0.05 mole) of acetanthranil in 60 milliliters of dry toluene was added to a stirred solution of 7.7 grams (0.06 mole) of 1-ethyl-3-pyrrolidylmethylamine. The mixture was stirred under reflux with concurrent separation of water for 22 hours, during which 78% of the theoretical water separated. The solution containing some tarry material was diluted with 200 milliliters of ether, washed with 5% sodium hydroxide, and then extracted with dilute hydrochloric acid. The acid extracts were combined, washed with ether, and basified with concentrated aqueous sodium hydroxide. The aqueous mixture was extracted with four 70 milliliter portions of chloroform, and the combined chloroform solutions were washed with water and dried. Concentration of the chloroform furnished 12.7 grams of an oil. The oil was dissolved in 50 milliliters of absolute ethanol, and 100 milliliters of butanone and two equivalents of alcoholic hydrogen chloride were added to furnish 11 grams of a buff solid, having a melting point of 236–239° C. The solid was dissolved in 100 milliliters of methanol and 150 milliliters of butanone were added. The solution was boiled with the addition of butanone to maintain a constant volume until a solid separated. Cooling gave 10.5 grams of a buff solid, having a melting point of 247–250° C. The melting point was unchanged upon recrystallization from absolute ethanol. Analysis by ultraviolet absorption in 0.1 N sodium hydroxide gave the following values: $\lambda=$ 317 mu, 305 mu, 275 mu, 267 mu and 228 mu; $\epsilon=$3,270, 4,200, 7,200, 7,570 and 28,900.

EXAMPLE II

3-(1-Methyl-3-Pyrrolidylmethyl)-4-Quinazolone Dihydrochloride

A mixture of 8.2 grams (0.05 mole) of isotoic anhydride and 5.7 grams (0.05 mole) of 1-methyl-3-pyrrolidylmethylamine in 75 milliliters of absolute ethanol was refluxed, the reaction being accompanied by vigorous gas evolution and solution of the reactants. The resultant solution was concentrated in vacuo to a syrupy residue which was again refluxed with 75 milliliters of formic acid for 3 hours. The solution was then concentrated in vacuo, and the residue mixed with chipped ice and made strongly alkaline with 40% sodium hydroxide. The oily mixture was extracted with 175 milliliters of chloroform, and the chloroform solution was washed with brine and dried over magnesium sulfate. Eleven and four-tenths grams of oil were obtained upon concentration of the chloroform, the oil was dissolved in absolute ethanol-butanone, and two equivalents of ethanolic hydrogen chloride were added portionwise during which addition a solid separated. A product yield of 12.5 grams or 79% resulted. The melting point of the product varied with the amount of sample and rate of heat, and after recrystallization from ethanol a small sample melted at 218–220° C. using very slow heating. Analysis by ultraviolet absorption in 0.1 normal sodium hydroxide gave the following values: $\lambda=$ 314 mu, 302 mu, 275 mu, 266 mu and 238 mu; $\epsilon=$2,530, 3,160, 5,430, 5,650 and 22,600.

The 3-(1-ethyl-3-pyrrolidylmethyl) derivatives contemplated by this invention may be prepared in a manner similar to the above compound.

The following table illustrates the properties of further compositions prepared by procedures illustrated in the foregoing examples. The compound of Example III was prepared by the procedure of Example II. The compounds of Examples IV through VII were prepared by the procedure of Example I. The starting material for Examples VI and VII was 6-chloroacetanthranil.

TABLE I.—3-PYRROLIDYLMETHYL-4-QUINAZOLONES

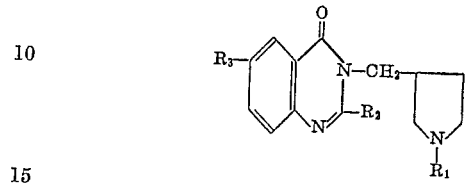

| Example | $R_1$ | $R_2$ | $R_3$ | Melting Point, °C. (dec.) | Purification [1] | Salt |
|---|---|---|---|---|---|---|
| III | $C_2H_5$ | H | H | 133–135 | b–c | Dihydrochloride. |
| IV | $CH_3$ | $CH_3$ | H | 177–179 | a–d | Hemi-mucate. |
| V | $CH_3$ | $CH_3$ | H | 232–240 | c–e | Dihydrochloride. |
| VI | $CH_3$ | $CH_2$ | Cl | 244–250 | e–f | Do. |
| VII | $C_2H_5$ | $CH_3$ | Cl | 208–211 | g–ceh | Monohydrochloride. |

[1] The letters appearing in this column refer to the solvents from which the products were recrystallized, as follows:
(a) ethanol; (b) isopropanol; (c) absolute ethanol; (d) water; (e) butanone; (f) methanol; (g) acetonitrile; (h) ether.

While several particular embodiments of this invention are shown above, it will be understood, of course, that the invention is not limited thereto, since many modifications may be made, and it is contemplated, therefore, by the appended claims, to cover any such modifications as fall within the true spirit and scope of this invention.

I claim:

1. A compound selected from the group consisting of a compound of the formula:

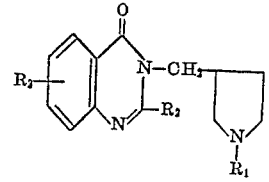

wherein $R_1$ is lower alkyl, $R_2$ is selected from the group consisting of hydrogen and lower alkyl, and $R_3$ is selected from the group consisting of hydrogen and halogen and the nontoxic pharmacologically acceptable therapeutically active acid addition salts thereof.

2. 2-lower alkyl-3-(1-lower alkyl-3-pyrrolidylmethyl)-4-quinazolone.
3. 3-(1-lower alkyl-3-pyrrolidylmethyl)-4-quinazolone.
4. 2-lower alkyl-3-(1-lower alkyl-3-pyrrolidylmethyl)-chloro-4-quinazolone.
5. 3-(1-lower alkyl-3-pyrrolidylmethyl)-chloro-4-quinazolone.
6. 3-(1methyl-3-pyrrolidylmethyl)-4-quinazolone.
7. 3-(1-ethyl-3-pyrrolidylmethyl)-4-quinazolone.
8. 2-methyl-3-(1-methyl-3-pyrrolidylmethyl)-4-quinazolone.
9. 2-methyl-3-(1-ethyl-3-pyrrolidylmethyl)-4-quinazolone.
10. 2-methyl-3-(1-methyl-3-pyrrolidylmethyl)-6-chloro-4-quinazolone.
11. 2-methyl-3-(1-ethyl-3-pyrrolidylmethyl)-6-chloro-4-quinazolone.

References Cited in the file of this patent

Baker et al.: J. Org. Chem., Volume 17, pages 35–36 (1952).